(12) United States Patent
Sasaki et al.

(10) Patent No.: US 7,201,843 B2
(45) Date of Patent: Apr. 10, 2007

(54) FRAMED STORM DRAIN INSERT SEDIMENT FILTER

(75) Inventors: Derek A. Sasaki, Vancouver, WA (US); Roni R. Sasaki, Vancouver, WA (US)

(73) Assignee: Spider Environmental, Inc., Vancouver, WA (US)

( * ) Notice: Subject to any disclaimer, the term of this patent is extended or adjusted under 35 U.S.C. 154(b) by 591 days.

(21) Appl. No.: 10/202,200

(22) Filed: Jul. 23, 2002

(65) Prior Publication Data

US 2004/0016692 A1    Jan. 29, 2004

(51) Int. Cl.
B01D 29/27    (2006.01)
(52) U.S. Cl. .................. 210/164; 210/478; 210/495
(58) Field of Classification Search ............... 210/153, 210/162–164, 317, 474, 477, 478, 482, 495, 210/499, 456, 479, 480, 497.01, 767; 248/94; 383/33
See application file for complete search history.

(56) References Cited

U.S. PATENT DOCUMENTS

| | | | |
|---|---|---|---|
| 1,310,773 A * | 7/1919 | Wills ........................... 210/471 |
| 1,652,970 A * | 12/1927 | Workman ................... 210/495 |
| 1,961,947 A * | 6/1934 | Sieling ........................ 210/495 |
| 2,496,757 A | 2/1950 | Sieling |
| 3,282,430 A | 11/1966 | Kinne |
| 3,713,539 A | 1/1973 | Thompson et al. |
| 4,419,232 A | 12/1983 | Arntyr et al. |
| 5,372,714 A | 12/1994 | Logue, Jr. |
| 5,575,925 A | 11/1996 | Logue, Jr. |
| 5,733,445 A | 3/1998 | Fanelli |
| 5,954,952 A | 9/1999 | Strawser, Sr. |
| 6,010,622 A | 1/2000 | Chinn et al. |
| 6,045,691 A | 4/2000 | McDermott |
| 6,059,964 A | 5/2000 | Strawser, Sr. |
| 6,086,758 A | 7/2000 | Schilling et al. |

(Continued)

FOREIGN PATENT DOCUMENTS

JP    11-222915 A  *  8/1999

(Continued)

OTHER PUBLICATIONS

U.S. Department of Transportation, *Underground Disposal of Storm Water Runoff*, Design Guidelines Manual, Feb. 1980, Table of Contents pp. xiv-xv, pp. 195-196, Appendix E-2 pp. E-2-1-E-2-6.

*Primary Examiner*—Matthew O. Savage
(74) *Attorney, Agent, or Firm*—Marger Johnson & McCollom, P.C.

(57) ABSTRACT

The new design has three primary features: (1) a rectangular collar having a centrally located circular cutout with sewn loops formed on the outer edges of the collar; (2) a filter bag having top edges attached to the rectangular collar along the periphery of the circular cutout so that the bag is inserted within the cutout and drops below the level of the collar; and (3) a heavy gauge steel wire inserted within the sewn loops of the rectangular collar forming a structural frame along the periphery of the rectangular collar. The structural frame is preferably formed with overlapping portions coupled together with a retaining means. The overlapping portions are slidably moved relative to one another to change the first and/or second dimension of the frame so that the filter can fit within catch basins openings of various measurements.

9 Claims, 4 Drawing Sheets

U.S. PATENT DOCUMENTS 6,093,314 A     7/2000   Wilson et al.
6,214,216 B1 *  4/2001   Isaacson .................... 210/162
6,294,095 B1 *  9/2001   Lewis ....................... 210/747
6,805,804 B2 * 10/2004   Page ........................ 210/747

FOREIGN PATENT DOCUMENTS

WO      WO 88/03201      *  5/1988

* cited by examiner

FRAMED STORM DRAIN INSERT SEDIMENT FILTER

BACKGROUND OF THE INVENTION

This invention relates generally to storm water sewer systems, and more particularly to a drain insert adapted to prevent sediment or debris such as leaves, sand, stones, gravel and, in some cases, petroleum products, from entering into the storm water removal system.

There is increased importance being placed by cities on water treatment prior to the water entering the storm sewer system. Several treatment problems have been identified: stormwater run-off is contaminated with heavy metals and hydrocarbons which have leaked onto the streets and highways from a variety of sources, and leaves and other debris enter through the storm drain grate and clog storm basins outflows. In a typical storm water collection system, ground water from heavy rains or melted snow is collected in a storm sewer catch basin and flows into an underground sewer line. The water flows into the basin through openings in a grate on the top of the basin.

Water entering a sewer line should be free of solids. Early storm sewer filters removed solids from the water before the water flowed into the catch basin. These filters were made of a porous material and were located at or above grade level, which were readily visible. A very early version of this method simply used stacked hay bales around the periphery of the storm drain grate. The filters were typically placed horizontally on the top of the grate or, like the hay bales, stood up vertically in a circle above grade level, surrounding the grate. Water flowed freely through the filter and into the catch basin. Solids were captured by the filter. Over time, the solids built up on the filter, thereby impeding the free flow of water through the filter. As a result, the collected water flooded the area surrounding the storm sewer.

More modem catch basin inserts have been developed that can be installed below grade so that the solids are filtered from water without impeding the flow of water through the catch basin and into the sewer. Additionally, such filters were designed to be readily removed from the catch basin for dumping when filled with sediment and debris. Some examples of these types of filters are U.S. Pat. No. 5,575,925 (Logue, Jr.), and U.S. Pat. No. 6,086,758 (Schilling et al.), U.S. Pat. No. 6,093,314 (Wilson et al.), U.S. Pat. No. 6,059,964 (Strawser), and U.S. Pat. No. 6,045,691 (McDermott). These designs, while an improvement over the aboveground filters, suffer from several drawbacks. The Logue design, for instance comprises a filter bag with flaps that extend out from the periphery of the grate so that the grate anchors the filter bag within the catch basin. When the grate is lifted, however, the bag is subject to slide into the catch basin. The remaining prior art uses rigid frames that are adapted to fit a specifically sized drain opening and were thus not easily adaptable to differently sized or shaped openings.

Accordingly, the need remains for a drain filter insert that addresses these drawbacks in the prior art.

SUMMARY OF THE INVENTION

The new design has three primary features: (1) a rectangular collar having a centrally located circular cutout with sewn loops formed on the outer edges of the collar; (2) a filter bag having top edges attached to the rectangular collar along the periphery of the circular cutout so that the bag is inserted within the cutout and drops below the level of the collar; and (3) a heavy gauge steel wire inserted within the sewn loops of the rectangular collar forming a structural frame along the periphery of the rectangular collar.

The new design is used by removing the grate, placing the structurally supported peripheral edge of the rectangular collar within the recesses formed at the top of the drain basin, and then setting the grate on top of the peripheral edge including the heavy gauge steel wire. It is not generally necessary for holding the new filter insert within the basin since, even without the grate, the device is capable of holding 50 pounds of material without collapsing into the basin.

The advantages of the new design is that it is inexpensive and can be easily removed from the basin without fear of collapse into the basin due to the structural frame sitting on top of the basin recesses.

An alternate design uses the same collar and filter bag. The wire frame, however, is formed from four L-shaped wires that each overlap and form the four corners of the frame. The overlapping portions are slidingly clamped together with a heavy-duty "staple" of a type currently used within the furniture industry. The overlapping wires can then slide relative to one-another so that the dimensions of the rectangular frame can be changed and fitted into differently sized drain basins. The rectangular collar material is "gathered" along the wire frame so that its dimensions can change as well.

More generally, however, the catch basin filter constructed according to a preferred embodiment of the invention is for use with a catch basin of a type having a basin sidewall with an upper end at a catch basin inlet and a recess located at the upper end into which a grate is received. The catch basin filter includes a two-dimensional support frame adapted to be received within the recess of the catch basin beneath the grate. The filter further includes a filter bag coupled to the support frame, where the filter bag has an open top adapted to be positioned at the catch basin inlet, a closed bottom and a bag sidewall. When installed, the catch basin filter is placed wholly within the catch basin chamber so that the frame rests on the recess of the catch basin and the grate placed over the frame. The rigidity of the frame is such that it is capable of maintaining the catch basin filter in position with the bag suspended within the catch basin chamber with or without the grate installed on top of the frame.

In an adjustable embodiment of the invention, the frame includes means for changing a first and/or second dimension of the support frame so that the frame can be adjusted to fit catch basins having a variety of inlet sizes. According to a preferred embodiment of the frame changing means, the frame includes a rigid member such as heavy gauge wire slidingly maintained within a retaining member such as a furniture staple where the rigid member is moved within the retaining member to change the dimension of the rigid member and thus the frame.

The foregoing and other objects, features and advantages of the invention will become more readily apparent from the following detailed description of a preferred embodiment of the invention that proceeds with reference to the accompanying drawings.

DETAILED DESCRIPTION

Figure 1:
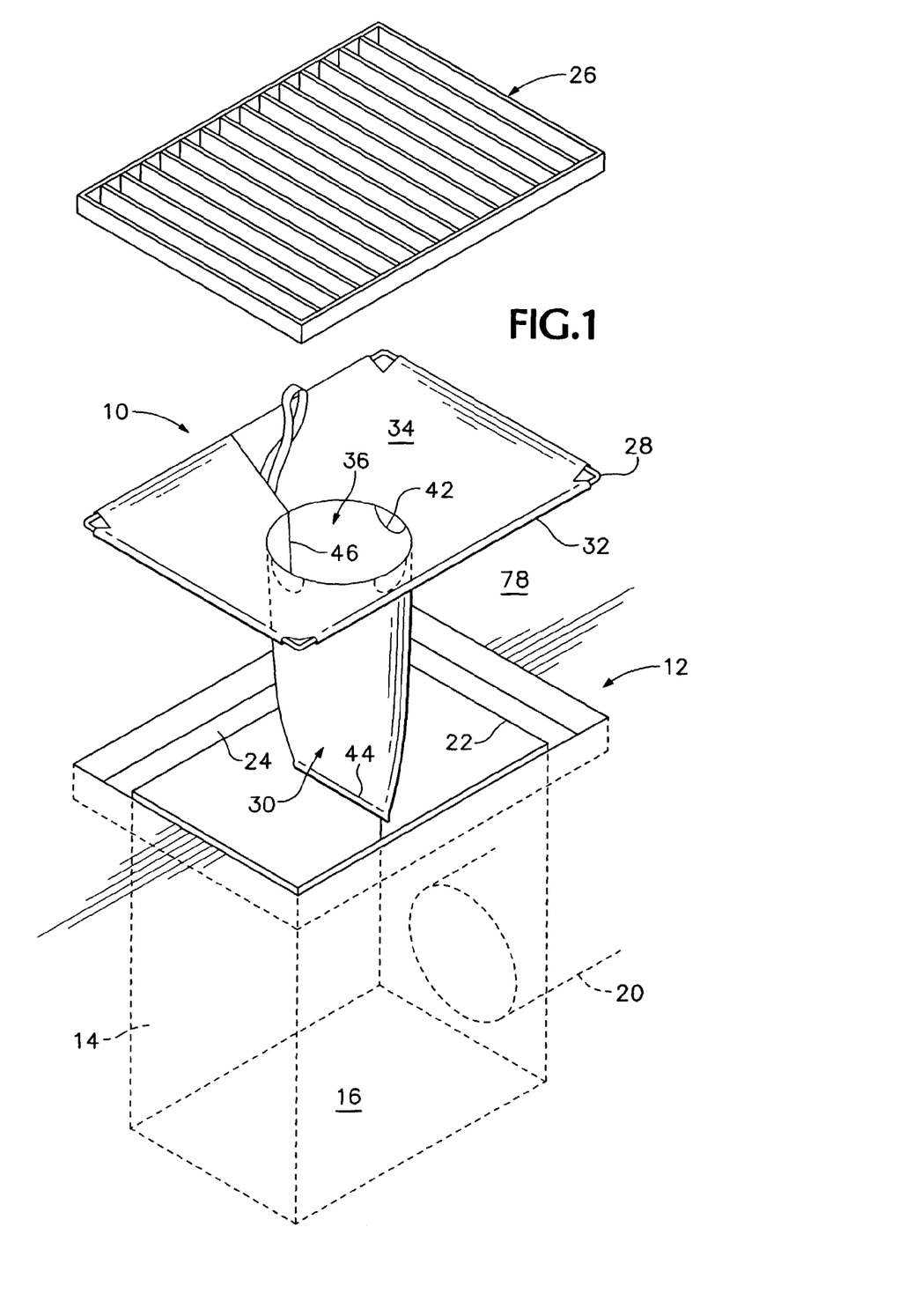
FIG. 1 is a perspective view of the catch basin and filter constructed and installed according to a preferred embodiment of the invention shown in exploded view.

A catch basin filter constructed according to a preferred embodiment of the invention is shown generally at 10 in FIG. 1. Filter 10 is intended to be installed within a below-grade 78 catch basin 12 of a type having basin sidewalls 14 and floor 16 defining a chamber 18. A sewer pipe 20 extends away from one of the sidewalls 14 a distance above the floor 16. There would typically be four sidewalls for a rectangular chamber and one continuous sidewall for a cylindrical chamber. The catch basin 12 includes an upper end defining a catch basin inlet 22 and a recess 24 located at the upper end into which a grate 26 is normally received. Ground water and solids flow through the grate and inlet, into the catch basin chamber 18, and thence out through the sewer pipe 20.

Figure 2:
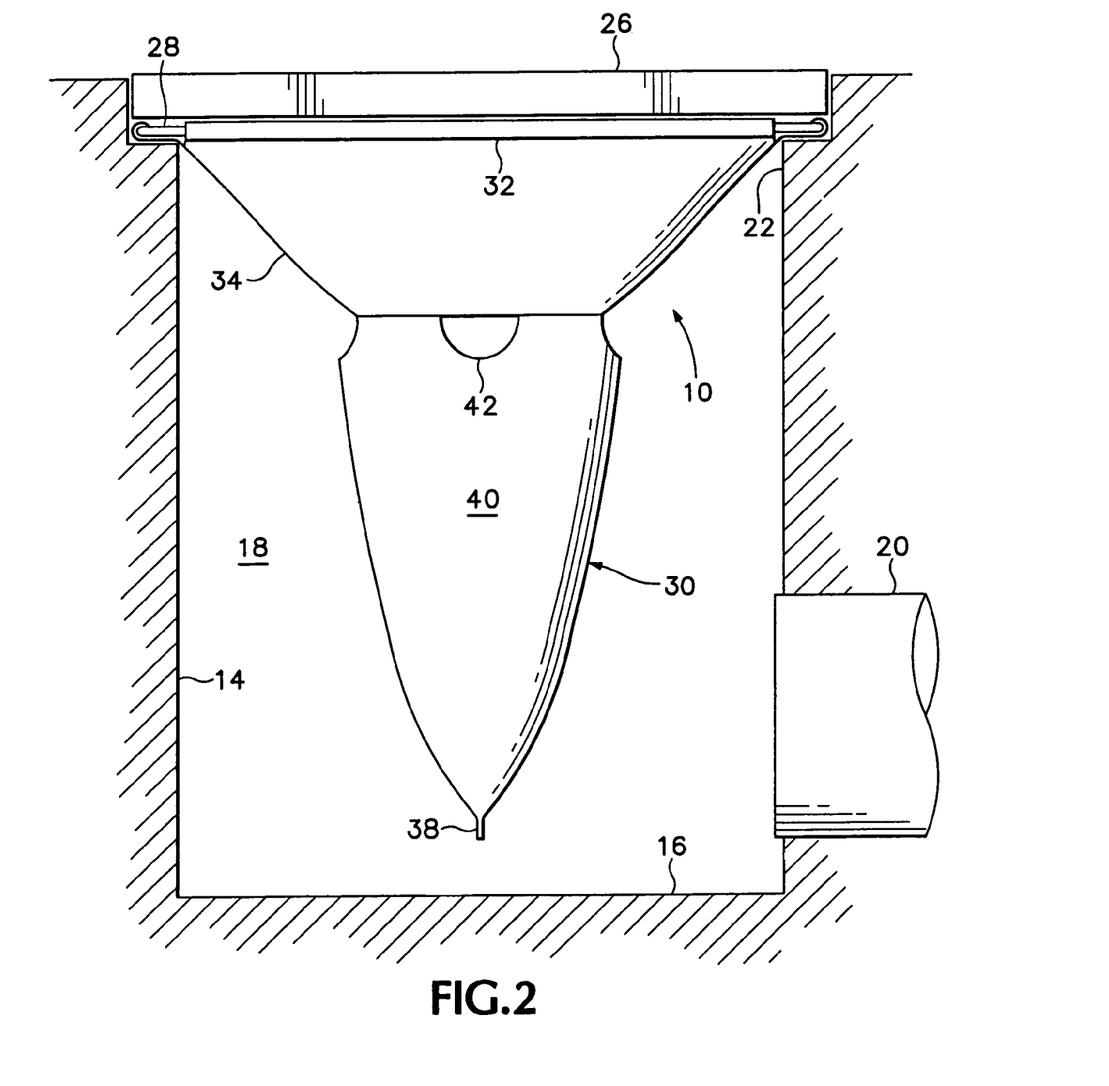
FIG. 2 is a side sectional view of the invention shown in FIG. 1.
Figure 3:
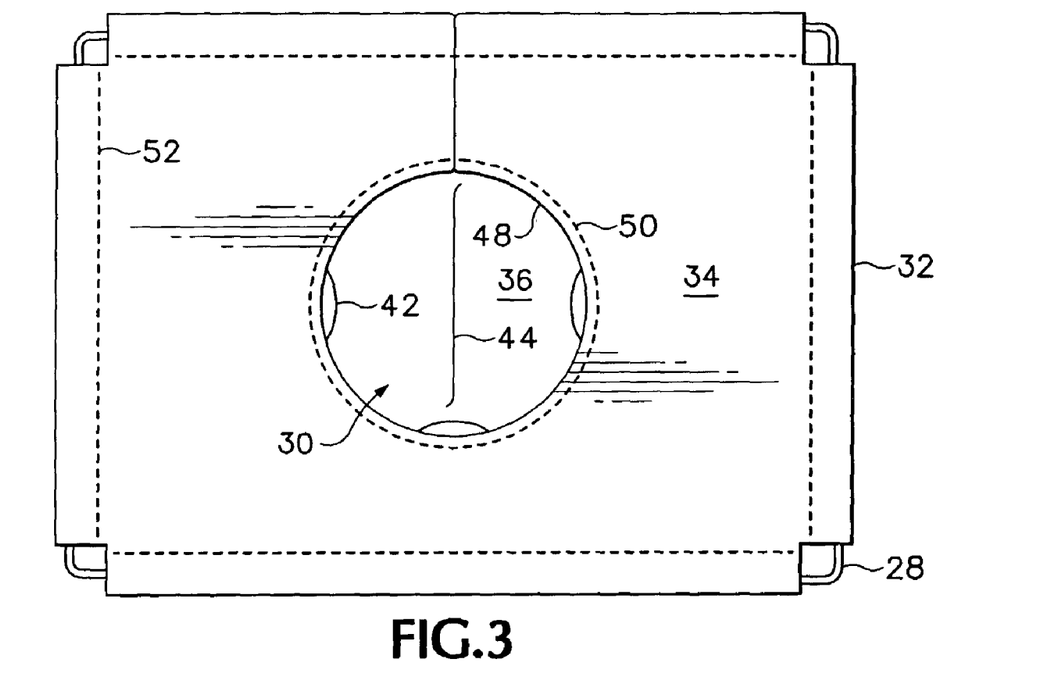
FIG. 3 is a top plan view of the catch basin filter according to a first embodiment of the invention.

As shown also in FIGS. 2 and 3, catch basin filter 10 includes a two-dimensional support frame 28 adapted to be received within and rest upon recess 24 of catch basin 12 and beneath grate 26. As the catch basin inlet 22 has a rectangular opening into catch basin chamber 18, frame 28 is similarly rectangular and is sized with a length and width to hang on a horizontal surface of recess 24 to thereby support the remainder of the filter attached thereto. The filter further includes a filter bag 30 coupled to the support frame as via loops 32 sewn in the fabric of a collar 34 (see, e.g., FIG. 7). Filter bag 30 has an open top 36, closed bottom 38 and bag sidewall 40, and is adapted to be positioned at the catch basin inlet 22 and suspended within catch basin chamber 18. Bag 30 preferably includes overflow apertures 42 located at a top portion of the bag sidewall 40 to allow excess (unfiltered) water to exit bag 30 and into the catch basin during heavy rainstorms.

The bag 30 as shown in FIG. 3 is formed of a single piece of geotextile nonwoven fabric rolled into a cylinder to form the single bag sidewall 40 and round open top 36. The bag is then closed with a bottom seam 44 and a side seam 46. A rectangular expanse of the same filter fabric is used to form collar 34. A centrally located circular cutout 48 is formed in collar 34 and the topmost portion of the bag sidewall is affixed via seam 50 thereto so that the bag is inserted within the cutout and drops below the level of the collar. Material along the periphery of the collar expanse 34 is folded back and affixed via seam 52 to the collar to form the loops 32 through which the 28 frame is received.

Figure 4:
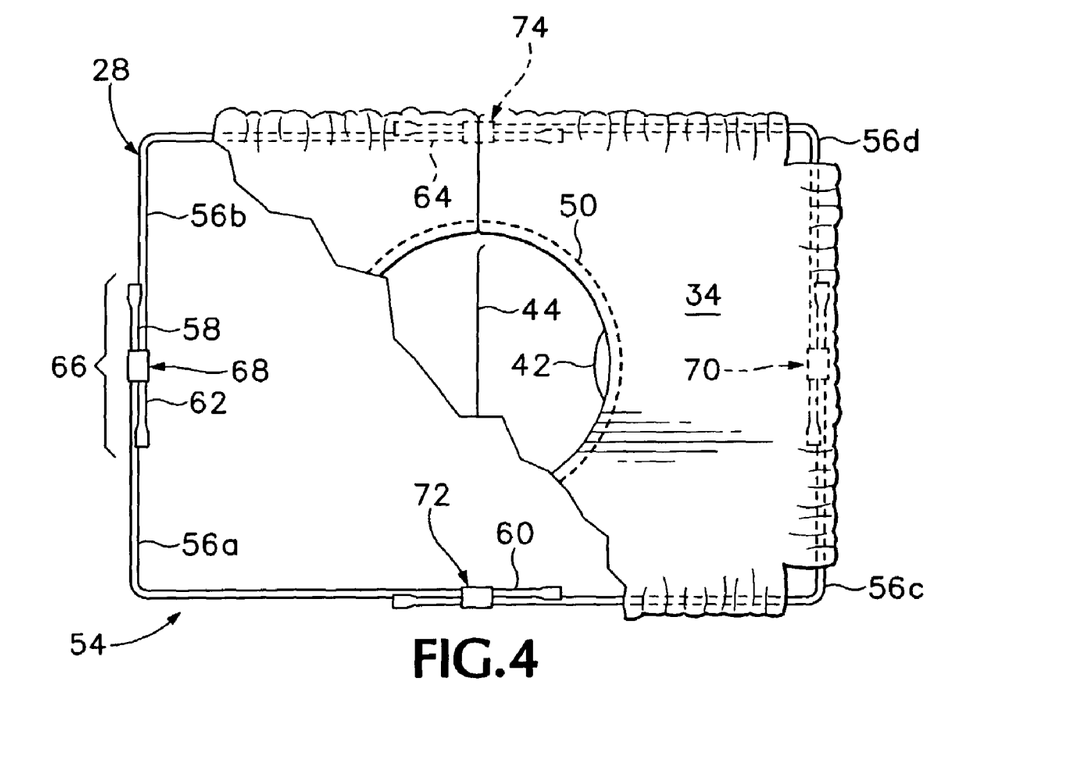
FIG. 4 is a top plan view in partial cutaway of an adjustable catch basin filter constructed according to a second embodiment of the invention shown in a partially collapsed or contracted condition for use with catch basins having rectangular openings or inlets.

An alternate embodiment of the catch basin filter is shown generally at 54 in FIG. 4. Filter 54 is adjustable in two dimensions so that both (or either) the width and the length of support frame 30 can be adjusted to allow the frame to be fitted within catch basins of various dimensions. Filter 54 includes four L-shaped rigid members 56a–56d, with members 56b and 56c being first and second adjacent rigid members to member 56a, respectively, and member 56d being the opposed L-shaped rigid member to member 56a. Each of the L-shaped rigid members 56a–56d have two end portions, such as end portions 58 and 60 on member 56a, and end portions 62 and 64 on member 56b. One end portion of a one member overlaps an end portion of an adjacent member, for instance end portion 58 of member 56a overlaps end portion 62 of member 56b to form an overlapping section 66. The remaining members are arranged so that there are a total of four overlapping sections such as section 66, thereby forming a rectangular support structure.

Each overlapping section, such as section 66, includes a retaining member 68. Portions of the overlapping section 66 are slidably received within the retaining member 68 so that the end portions received 58, 62 can be moved in opposing directions relative to one another to thereby change the length and width of the rectangular support frame. To change the width, for instance, the overlapping sections in retaining member 68 and opposing receiving member 70 (coupling together L-shaped rigid members 56c and 56d) are manipulated as by pulling the top and bottom sections apart or pushing them together. Similarly, to change the length, the overlapping sections in opposing retaining members 72 and 74 are pulled apart to lengthen the frame or pushed together to shorten the frame.

Figure 5:
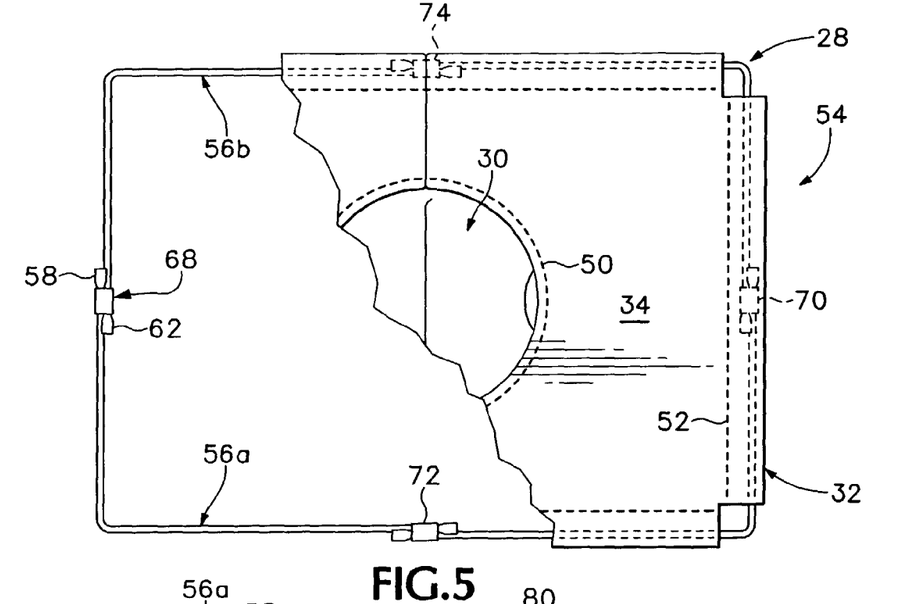
FIG. 5 is a top plan view in partial cutaway of the adjustable catch basin filter of FIG. 4 shown in a maximally dimensioned or extended condition.

FIG. 4 shows the filter 60 in a contracted state and FIG. 5 shows the same filter 60 in a fully expanded state. The collar 34 includes an expanse of fabric so that it is expandable in the first and second dimensions, as by including gathered fabric (FIG. 4) which is then pulled taut when the frame is expanded (FIG. 5).

It is understood that the filter 60 can be modified so that it is expandable in only a single dimension. Instead of the frame being formed of four L-shaped rigid members, it could be formed of two U-shaped members coupled together using two opposed receiving members on the two resulting overlapping sections, such as members 72, 74. The U-shaped members can then be pulled apart or pushed together until the desired width of the filter is achieved.

Figures 6A, 6B:
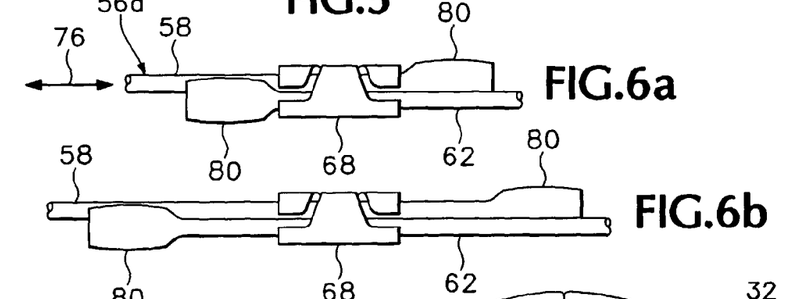
FIGS. 6a and 6b illustrate the preferred means for adjusting the dimensions of the catch basin filter in extended and contracted positions, respectively.

The dimension changing means are shown in more detail in FIGS. 6a and 6b showing maximally expanded and contracted positions, respectively. FIG. 6a shows overlapping section 66 comprised of end portion 58 of rigid member 56a and end portion 62 of rigid member 56b. The retaining member 68 coupling together members 56a and 56b is preferably of the type used in the furniture building industry, a metal staple clamped around the two members with enough force to maintain the members together but still allow the members to slide in opposing directions (double-sided arrow 76) when sufficient pulling or pushing force is applied to the members. A retaining end is formed at the distal end of the end portion, such as end 80 on end portion 62, with the retaining end 80 engageable with the retaining member 68 to provide a sliding boundary on the rigid member 62. When the rigid member 62 is a heavy gauge steel wire, the end of the wire can be flattened to increase its width so that the end cannot slide through the staple 68. The retaining end thereby prevents the rigid portions from being pulled completely out from the retaining member 68.

Figures 7, 8:
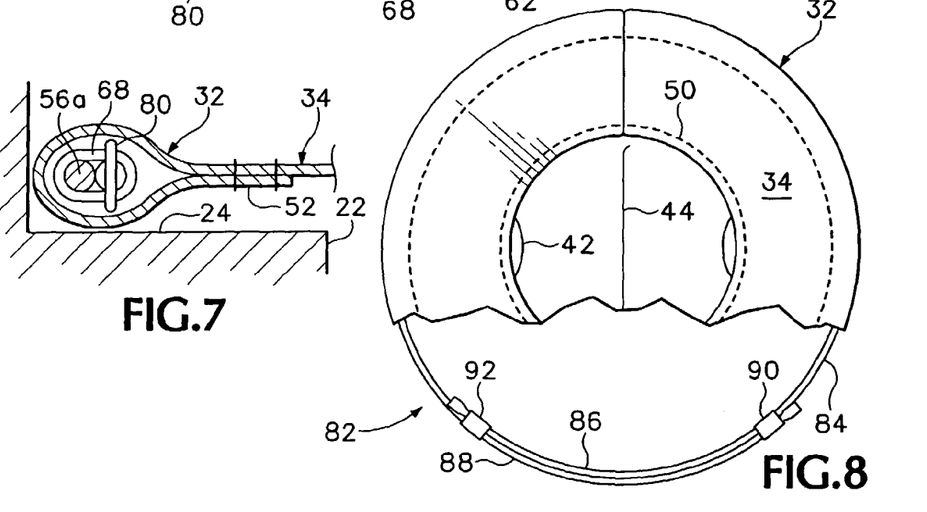
FIG. 7 is a sectional view of the means in FIGS. 6a and 6B as installed within the filter and resting on the recess of the catch basin.
FIG. 8 is a top plan view in partial cutaway of an adjustable catch basin filter constructed according to a third embodiment of the invention for use with circular catch basin inlets.

A side view of a portion of the filter is shown in section in FIG. 7. The means for changing the first dimension, comprised of rigid members 56a, 56b and retaining member 68 are received within loop 32 sewn within the collar 34. The rigid members received within retaining members 72 and 74 (not shown in FIG. 7) are manipulated to lengthen or shorten the filter frame such that the rigid members and retaining member 68 (and opposing rigid members and retaining member 70) of the frame are able to rest on the horizontal surface of the recess 24 formed at the top 22 of the catch basin sidewalls. As shown in FIG. 2, the collar, when used in the catch basin, is dimensioned so that it does not extend past the recess to a point outside the grate.

An alternate embodiment useful to fit round catch basin inlets is shown at 82 in FIG. 8. The support frame of filter 82 includes an annular rigid member 84 having first and second overlapping end portions 86, 88. The overlapping end portions 86, 88 are received within retaining members 90, 92 so that a diameter of the annular member 84 is changed responsive to movement of the end portions relative to one another within the retaining member. Again, the fabric expanse of collar 34 can be increased (or alternately be somewhat elastic) to accommodate a change in the dimensions of the filter frame. The loops 32 may therefore be expandable in the expansive dimension in cooperation with the means for changing the dimension of the support frame received therein.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A catch basin filter for use with a catch basin of a type having a basin sidewall with an upper end at a catch basin inlet and a recess located at the upper end into which a grate is received, wherein the catch basin filter includes:
    a two-dimensional support frame adapted to be received within the recess of the catch basin beneath the grate, said support frame including at least a first set of overlapping portions moveable relative to one another within a first retaining member to change a first dimension of the support frame and a second set of overlapping portions moveable relative to one another within a second retaining member to change a second dimension of the support frame; and
    a filter bag coupled to the support frame, said filter bag having an open top adapted to be positioned at the catch basin inlet a closed bottom and a bag sidewall.

2. The catch basin filter of claim 1, further including a retaining end defined on a distal end of one of the overlapping portions, said retaining end engageable with the first retaining member to provide a first sliding boundary on the overlapping portion.

3. A catch basin filter for use with a catch basin of a type having a basin sidewall with an upper end at a catch basin inlet and a recess located at the upper end into which a grate is received, wherein the catch basin filter includes:
    a two-dimensional support frame adapted to be received within the recess of the catch basin beneath the grate;
    a filter bag coupled to the support frame, said filter bag having an open top adapted to be positioned at the catch basin inlet, a closed bottom and a bag sidewall;
    means for changing a first dimension of the support frame; and
    a collar attached about a periphery of the filter bag top with loops defined in the collar away from the bag, said loops being expandable in the first dimension in cooperation with the means for changing a first dimension of the support frame received therein.

4. The catch basin filter of claim 3, wherein the collar, when used within the catch basin, is dimensioned so that it does not extend past the recess to a point outside the grate.

5. A catch basin filter for use with a catch basin of a type having a basin sidewall with an upper end at a catch basin inlet and a recess located at the upper end into which a grate is received, wherein the catch basin filter includes:
    a two-dimensional support frame adapted to be received within the recess of the catch basin beneath the grate; and
    a filter bag coupled to the support frame, said filter bag having an open top adapted to be positioned at the catch basin inlet, a closed bottom and a bag sidewall, wherein the support frame includes:
    an L-shaped rigid member, a first adjacent L-shaped rigid member, a second adjacent L-shaped rigid member, and an opposed L-shaped rigid member, each of the L-shaped rigid members having two end portions and arranged so that the first end portion of the L-shaped rigid member overlaps an end portion of the first adjacent L-shaped rigid member and the second end portion of the L-shaped rigid member overlaps an end portion of the second adjacent L-shaped rigid member, with the opposed L-shaped rigid member likewise arranged so as to form a rectangular support frame having four overlapping sections; and
    for each overlapping section, a retaining member for slidably receiving the overlapping section therein so that the end portions of the rigid members forming the overlapping section can be moved in opposing directions relative to one another to thereby change the length and width of the rectangular support frame so that the support frame can be received within catch basin sidewall recesses of various dimensions.

6. The catch basin filter of claim 5, further including a collar attached about a periphery of the filter bag top with loops defined in the collar away from the bag, said loops being expandable in the first and second dimension in cooperation with the means for changing a first and second dimension of the support frame received therein.

7. The catch basin filter of claim 6, wherein the collar, when used within the catch basin, is dimensioned so that it does not extend past the recess to a point outside the grate.

8. A catch basin filter for use with a catch basin of a type having a basin sidewall with an upper end at a catch basin inlet and a recess located at the upper end into witch a grate is received, wherein the catch basin filter includes:
    a two-dimensional support frame adapted to be received within the recess of the catch basin beneath the grate;
    means for changing a first dimension of the support frame; and
    a filter bag having an open top adapted to be positioned at the catch basin inlet, a closed bottom and a bag sidewall, said filter bag being coupled to the support frame via loops and fabric of such a size as to allow it to expand in synergy with the means for changing the first dimension of the support frame such that the fabric is gathered along the loops in a contracted stated and tensioned in an expanded state.

9. The catch basin filter of claim 8, further including a collar attached about a periphery of the filter bag open top.

* * * * *

UNITED STATES PATENT AND TRADEMARK OFFICE
CERTIFICATE OF CORRECTION

| | | |
|---|---|---|
| PATENT NO. | : 7,201,843 B2 | |
| APPLICATION NO. | : 10/202200 | |
| DATED | : April 10, 2007 | |
| INVENTOR(S) | : Derek A. Sasaki et al. | |

It is certified that error appears in the above-identified patent and that said Letters Patent is hereby corrected as shown below:

Column 1, line 36, the word "modem" should be replaced with -- modern --;
Column 5, line 36, the word "inlet" should be replaced with -- inlet, --;
Column 6, line 43, the word "witch" should be replaced with -- which --;
Column 6, line 55, the word "stated" should be replaced with -- state --;
Column 6, line 56, beginning at "...state." Please insert the following
-- ...state;
    means for changing a second dimension of the support frame, the first and second means comprising: and L-shaped rigid member, a first adjacent L-shaped rigid member, a second adjacent L-shaped rigid member, and an opposed L-shaped rigid member, each of the L-shaped rigid members having two end portions and arranged so that the first end portion of the L-shaped rigid member overlaps an end portion of the first adjacent L-shaped rigid member and the second end portion of the L-shaped rigid member overlaps an end portion of the second adjacent L-shaped rigid member, with the opposed L-shaped rigid member likewise arranged so as to form a rectangular support frame having four overlapping sections; and
    for each overlapping section, a retaining member for slidably receiving the overlapping section therein so that the end portions of the rigid members forming the overlapping section can be moved in opposing directions relative to one another to thereby change the length and width of the rectangular support frame so that the support frame can be received within the catch basin sidewall recesses of various dimensions. --;
Column 6, line 58, delete the words "open top".

Signed and Sealed this
Thirtieth Day of October, 2012

David J. Kappos
*Director of the United States Patent and Trademark Office*

(12) EX PARTE REEXAMINATION CERTIFICATE (9922nd)
United States Patent
Sasaki et al.

(10) Number: US 7,201,843 C1
(45) Certificate Issued: Nov. 6, 2013

(54) FRAMED STORM DRAIN INSERT SEDIMENT FILTER

(75) Inventors: Derek A. Sasaki, Vancouver, WA (US); Roni R. Sasaki, Vancouver, WA (US)

(73) Assignee: Spider Environmental, Inc., Vancouver, WA (US)

Reexamination Request:
No. 90/009,988, Feb. 22, 2012

Reexamination Certificate for:
Patent No.: 7,201,843
Issued: Apr. 10, 2007
Appl. No.: 10/202,200
Filed: Jul. 23, 2002

Certificate of Correction issued Oct. 30, 2012

(51) Int. Cl.
*B01D 29/27* (2006.01)
(52) U.S. Cl.
USPC .............................. 210/164; 210/478; 210/495
(58) Field of Classification Search
None
See application file for complete search history.

(56) References Cited

To view the complete listing of prior art documents cited during the proceeding for Reexamination Control Number 90/009,988, please refer to the USPTO's public Patent Application Information Retrieval (PAIR) system under the Display References tab.

*Primary Examiner* — Robert M. Fetsuga (57) ABSTRACT

The new design has three primary features: (1) a rectangular collar having a centrally located circular cutout with sewn loops formed on the outer edges of the collar; (2) a filter bag having top edges attached to the rectangular collar along the periphery of the circular cutout so that the bag is inserted within the cutout and drops below the level of the collar; and (3) a heavy gauge steel wire inserted within the sewn loops of the rectangular collar forming a structural frame along the periphery of the rectangular collar. The structural frame is preferably formed with overlapping portions coupled together with a retaining means. The overlapping portions are slidably moved relative to one another to change the first and/or second dimension of the frame so that the filter can fit within catch basins openings of various measurements.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3, 5 and 8 are determined to be patentable as amended.

Claims 4, 6, 7 and 9, dependent on an amended claim, are determined to be patentable.

New claims 10 and 11 are added and determined to be patentable.

1. A catch basin filter for use with a catch basin of a type having a basin sidewall with an upper end at a catch basin inlet and a recess located at the upper end into which a grate is received, wherein the catch basin filter includes:
    a two-dimensional support frame adapted to be received within the recess of the catch basin beneath the grate, said support frame including at least a first set of overlapping portions moveable relative to one another within a first retaining member to change a first dimension of the support frame and a second set of overlapping portions moveable relative to one another within a second retaining member to change a second dimension of the support frame;
    *a retaining end defined on a distal end of one of the overlapping portions, said retaining end engageable with the first retaining member to provide a first sliding boundary on the overlapping portion;* and
    a filter bag coupled to the support frame, said filter bag having an open top adapted to be positioned at the catch basin inlet, a closed bottom and a bag sidewall.

3. A catch basin filter for use with a catch basin of a type having a basin sidewall with an upper end at a catch basin inlet and a recess located at the upper end into which a grate is received, wherein the catch basin filter includes:
    a two-dimensional support frame adapted to be received within the recess of the catch basin beneath the grate;
    a filter bag coupled to the support frame, said filter bag having an open top adapted to be positioned at the catch basin inlet, a closed bottom and a bag sidewall;
    means for changing a first dimension of the support frame, *the means including overlapping portions and further including a retaining end defined on a distal end of one of the overlapping portions, said retaining end engageable with the first retaining member to provide a first sliding boundary on the overlapping portion;* and
    a collar attached about a periphery of the filter bag top with loops defined in the collar away from the bag, said loops being expandable in the first dimension in cooperation with the means for changing a first dimension of the support frame received therein.

5. A catch basin filter for use with a catch basin of a type having a basin sidewall with an upper end at a catch basin inlet and a recess located at the upper end into which a grate is received, wherein the catch basin filter includes:
    a two-dimensional support frame adapted to be received within the recess of the catch basin beneath the grate; and
    a filter bag coupled to the support frame, said filter bag having an open top adapted to be positioned at the catch basin inlet, a closed bottom and a bag sidewall, wherein the support frame includes:
    an L-shaped rigid member, a first adjacent L-shaped rigid member, a second adjacent L-shaped rigid member, and an opposed L-shaped rigid member, each of the L-shaped rigid members having two end portions and arranged so that the first end portion of the L-shaped rigid member overlaps an end portion of the first adjacent L-shaped rigid member and the second end portion of the L-shaped rigid member overlaps an end portion of the second adjacent L-shaped rigid member, with the opposed L-shaped rigid member likewise arranged so as to form a rectangular support frame having four overlapping sections; [and]
    for each overlapping section, a retaining member for slidably receiving the overlapping section therein so that the end portions of the rigid members forming the overlapping section can be moved in opposing directions relative to one another to thereby change the length and width of the rectangular support frame so that the support frame can be received within catch basin sidewall recesses of various dimensions*; and*
    *a retaining end defined on a distal end of one of the end portions, said retaining end engageable with the first retaining member to provide a first sliding boundary on the end portion.*

8. A catch basin filter for use with a catch basin of a type having a basin sidewall with an upper end at a catch basin inlet and a recess located at the upper end into which a grate is received, wherein the catch basin filter includes:
    a two-dimensional support frame adapted to be received within the recess of the catch basin beneath the grate;
    means for changing a first dimension of the support frame, *the means for changing a first dimension including overlapping portions and further including a retaining end defined on a distal end of one of the overlapping portions, said retaining end engageable with the first retaining member to provide a first sliding boundary on the overlapping portion*; and
    a filter bag having an open top adapted to be positioned at the catch basin inlet, a closed bottom and a bag sidewall, said filter bag being coupled to the support frame via loops and fabric of such a size as to allow it to expand in synergy with the means for changing the first dimension of the support frame such that the fabric is gathered along the loops in a contracted state and tensioned in an expanded state;
    means for changing a second dimension of the support frame, the first and second means comprising: [and] *an* L-shaped rigid member, a first adjacent L-shaped rigid member, a second adjacent L-shaped rigid member, and an opposed L-shaped rigid member, each of the L-shaped rigid members having two end portions and arranged so that the first end portion of the L-shaped rigid member overlaps an end portion of the first adjacent L-shaped rigid member *to form one of the overlapping portions* and the second end portion of the L-shaped rigid member overlaps an end portion of the second adjacent L-shaped rigid member *to form a second one of the overlapping portions*, with the opposed L-shaped rigid member likewise arranged so as to form a rectangular support frame having four overlapping sections; and for each overlapping section, a retaining member for slidably receiving the overlapping section therein so that the end portions of the rigid members forming the overlapping section can be moved in opposing directions relative to one another to thereby change the length and width of the rectangular support frame so that the support frame can be received within the catch basin sidewall recesses of various dimensions.

10. *The catch basin filter of claim 1, wherein at least one of the first set of overlapping portions forms an L-shaped rigid member with at least one of the second set of overlapping portions and wherein the support frame is configured such that the second dimension of the support frame can be changed independently of the first dimension.*

11. *The catch basin filter of claim 5, wherein the length and width of the rectangular support frame can be changed independently of one another.*

\* \* \* \* \*